UNITED STATES PATENT OFFICE.

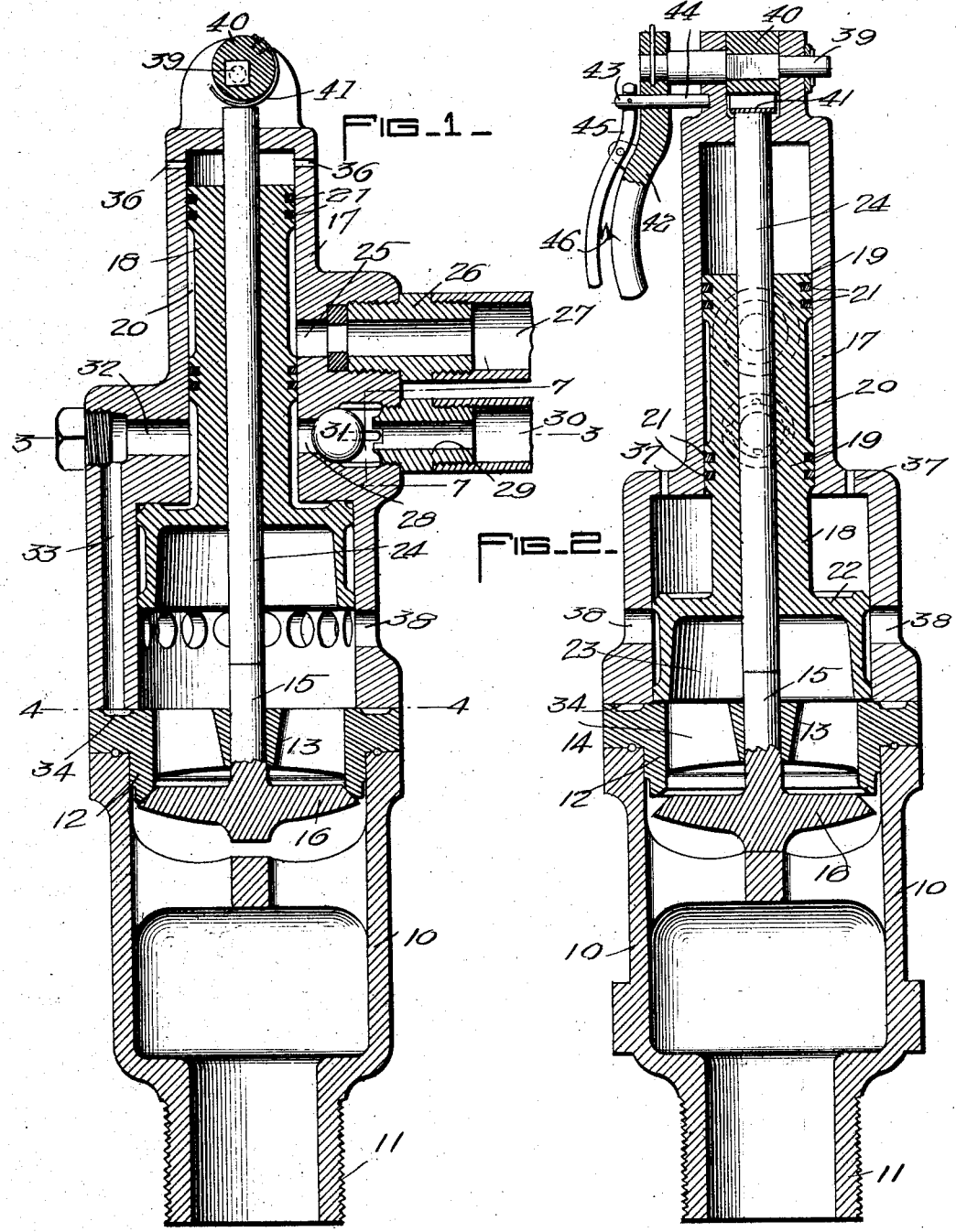

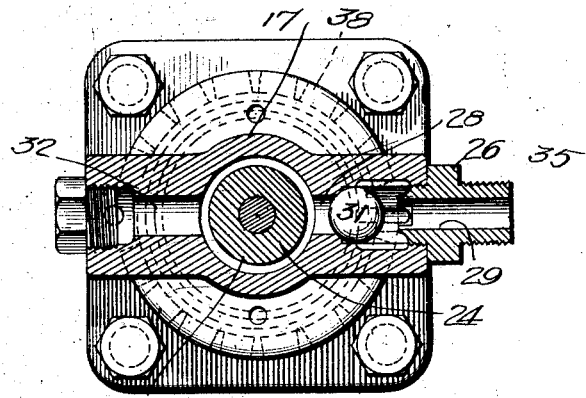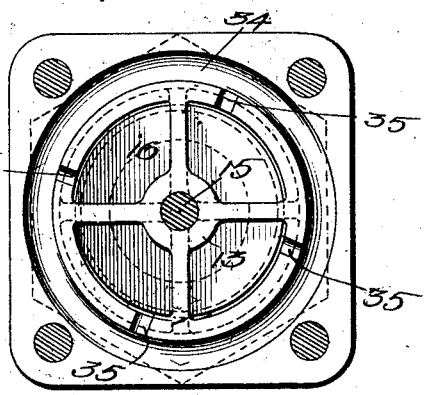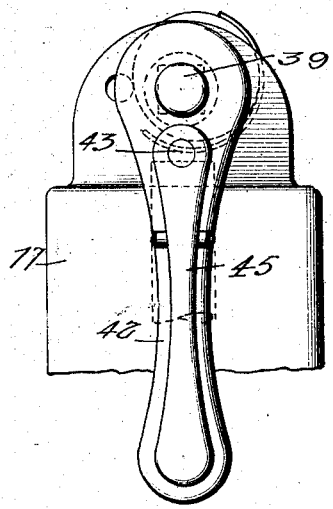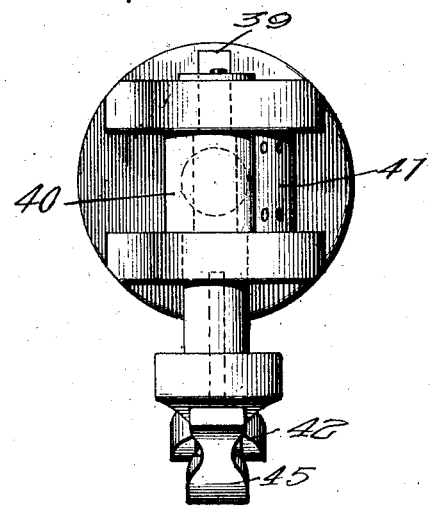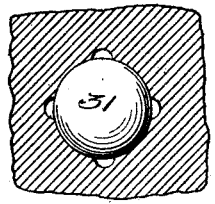

JOHN FRANCIS MILLER, OF DOUGLAS, ARIZONA.

COMBINED DRIFTING AND RELIEF VALVE FOR LOCOMOTIVES.

1,174,752.

Specification of Letters Patent.

Patented Mar. 7, 1916.

Application filed August 20, 1915. Serial No. 46,482.

*To all whom it may concern:*

Be it known that I, JOHN F. MILLER, a citizen of the United States, and a resident of Douglas, in the county of Cochise and State of Arizona, have invented an Improvement in Combined Drifting and Relief Valves for Locomotives, of which the following is a specification.

This invention is an improvement in valves and has particular reference to combined drifting and relief valves adapted for use in connection with steam locomotives.

It is a common practice, in the operation of locomotives, to close the throttle valve thereof when descending a grade and thereby shut off the supply of steam to the valve chests in which event serious damage would occur to the cylinders by reason of the partial vacuum produced therein. In order to overcome this difficulty it has been proposed, heretofore, to provide check or relief valves for the steam chests which would open to permit ingress of atmospheric air when the throttle valve was closed. This method is open to the serious objection that the inrush of cold air into the different passages which had been highly heated would cause a sudden change in the temperature therein resulting in the cracking or breaking of valves, bushings and other parts and the burning of lubricants and combustible gases formed by the mixture of oil, heat and air in the valve chambers.

The present invention is designed to overcome the above objections by the provision of a drift valve associated with a relief valve of any preferred construction and automatically operated upon the actuation of said relief valve to admit a constant supply of saturated steam from the boiler to the main super-heated valve chambers, steam pipes, or cylinders of the locomotive so that when the latter is drifting the combustible gases in said chambers will be destroyed and the temperature in the different parts will remain constant. This saturated steam, in addition to performing the above functions will also provide a cushion to assist in centralizing the pistons while the locomotive is drifting and thereby practically eliminate the drawing in of cinders and heat at the exhaust. When the locomotive is brought to a stop the drift valve is automatically closed by the usual escape of steam from the steam chests through the relief valves, the closing of said drift valve permitting the escape of said steam into the atmosphere.

The foregoing results are obtained with a simple construction consisting of a minimum number of parts easy to manufacture and assemble, durable, and effective in carrying out the purpose for which they are designed.

The inventive idea involved is capable of receiving a variety of mechanical expressions, one of which, for the purpose of illustrating the invention is shown in the accompanying drawings, in which—

Figure 1 is a vertical longitudinal sectional view through the valves showing the same in closed position. Fig. 2 is a view similar to Fig. 1 taken at right angles thereto and showing the valve in open position. Fig. 3 is a section on the line 3—3 of Fig. 1. Fig. 4 is a section on the line 4—4 of Fig. 1. Fig. 5 is a fragmentary side elevation of the top of the valve casing showing the means for manually operating the relief valve. Fig. 6 is a top plan view thereof. Fig. 7 is a section on the line 7—7 of Fig. 1.

The valve mechanism embodied by this invention is preferably mounted in an opening in the admission cavity of the steam chest of the locomotive and comprises a valve casing 10 having the lower end 11 thereof threaded whereby the same will be secured to said chest. Intermediate the ends of the casing 10 the same is provided with a valve seat 12 having a web portion 13 so as to provide openings 14 through said seat, said web having centrally mounted therein the valve stem 15 of the relief valve 16. The relief valve and mounting therefor is of common construction and it is to be understood that any preferred form of relief valve may be employed in connection with the invention.

The upper end of the valve casing 10 is reduced to provide a cylinder 17 in which is mounted a drift valve generally indicated by 18 and provided at its upper end and intermediate its ends with the heads 19 forming an annular depression or cavity 20 therebetween. The heads 19 each have mounted therein friction rings 21 adapted to engage the wall of cylinder 17. The lower end 22 of the valve 18 is enlarged and provided with a central depression 23, said enlarged end being adapted to reciprocate in the main portion of the valve casing 10 between the upper end thereof and the valve seat 12. The valve stem 24 passes longitudinally through the valve 18 and has its upper end mounted in the upper end of the valve casing 10 and its lower end adapted to engage the upper end of the valve stem 15 of the relief valve 16.

Adjacent the upper end of the casing 10 the same is provided with an inlet 25 in which is threaded a coupling 26 to the outer end of which is connected a pipe 27 which preferably connects the valve mechanism with the boiler of the locomotive. The inlet 25 is adapted to at all times communicate with the cavity 20 in the valve 18 so that a constant supply of saturated steam is maintained in said valve. Directly below in alinement with the inlet 25 the casing 10 is also provided with an outlet 28 which is adapted to be bridged by the cavity 20 when the drift valve 18 is operated in a manner to appear in the course of this description. A coupling 29 is mounted in the outlet 28 and has connected thereto a pipe 30 which communicates with either or all of the main steam heated parts of the engine, such as the valve chamber, steam pipes or cylinders. Therefore when the main control of the locomotive is shut off the drift valve is operated, in a manner to be presently described, so as to cause the cavity 20 to connect the inlet 25 and outlet 28 whereby to permit the steam from the pipe 27 to pass out through the pipe 30 to the different parts. A small check valve 31 in the form of a ball is mounted in the outlet 28 and is adapted to prevent back pressure from the pipe 30 into the valve casing when the drift valve is closed. The valve casing is also provided with the communicating by-passes 32 and 33, the lower end of the latter communicating with an annular cavity 34 formed in the top of the valve seat 12, the latter having grooves 35 for permitting steam from the by-pass 33 to pass into the interior of the casing when the drift and relief valves are open. This supply of steam is also supplied by the bridging of the inlet 25 and the inner end of the by-pass 32 by the cavity 20 and flows past the relief valve when the same is open into the valve chambers so that any combustible gases formed therein are destroyed.

The manner of causing the operation of the drift valve 18 includes the admission of atmospheric pressure into the casing 10 above the upper head 19 and the enlarged end 22 of said valve through the ports 36 and 37, respectively. When the locomotive is drifting and the main throttle has been closed, the relief valve 16 will open and cause a suction through the plurality of openings 38 formed in the valve casing 10 a slight distance above the valve seat 12. This suction will produce a partial vacuum under the enlarged end 22 of the drift valve and cause the same to move downwardly to the position shown in Fig. 2, when the cavity 20 will connect the inlet and outlet ports 25 and 28 and by-pass 32, the movement of said valve downwardly being facilitated by the atmospheric pressure above the parts 19 and 22 thereof. As long as the locomotive is drifting and the throttle closed the drift will remain in its open position closing the openings 38 and a constant supply of steam will be transmitted to the different parts of the engine to which the pipe 30 is connected. When the locomotive comes to a stop, the relief valve being opened as usual, steam from the steam chest will escape past said valve and through the valve seat 12 into the cavity 23 of the valve 18 and the pressure of said steam will cause said valve to return to its closed position whereupon the steam will be permitted to pass out through the openings 38 into the atmosphere. It is not uncommon for these relief valves to fail to remain open at all times while the engine is at a standstill with the main throttle closed, this condition being due to various causes, such as when the engine is reversed an instant before it comes to a stop which results in the relief valves engaging their seats. When once seated but little pressure is necessary to hold these valves closed and for this reason the by-pass 33, annular cavity 34 in the top of the valve seat 12, and the grooves in said top are provided. Should the relief valve become closed, as suggested above, the pressure of the steam entering through the ports 35 will again open the relief valve and thus retain the drift valve in closed position.

The boilers of locomotives are often required to undergo tests of various kinds and in so doing the steam pipes and valve cavities are left containing more or less water. Initial steam is almost invariably generated by a forced draft and the steam generated from the water trapped, as mentioned above, is unable, in some cases, to escape to the atmosphere through the relief valves without attaining a pressure that will force said valves to their seats thus leaving the locomotive in danger of inadvertently starting. To meet the above difficulty the relief valves must be held open against this pressure and it has been the common practice, heretofore, to do this with a bar wrench or other like implement. This method has been found defective and inconvenient in many respects and an improved device has therefore been provided in connection with the present invention for effectively locking the relief valves in open position whenever desired. This locking device comprises a shaft 39 which is journaled in the top of the casing 10 and has mounted thereon an eccentric 40 having one end of a flat spring 41 secured thereto, the free end thereof being adapted to engage the upper end of the valve stem 24 whereby to assist in retaining the relief valve in open position against the slight pressure of the leaking steam from the steam chest. One end of the shaft 39 is provided with a handle 42 through which a locking pin 43 extends, one end of said pin being adapted to engage a notch 44 formed in the adjacent face of the casing whereby the eccentric 40 is retained in adjusted position. A lever 45 is pivoted intermediate its ends to the handle 42 and also pivoted at one of its ends to the pin 43. A spring 46 is interposed between the handle 42 and lever 45 whereby the pin is normally held in its locking position.

What is claimed is:—

1. A drift valve mechanism for locomotive engines comprising a casing, a relief valve mounted therein and a drift valve also mounted therein, said casing being provided with steam inlet and outlet openings and adapted to be connected when the drift valve is open, and with by-passes for supplying a jet of steam to one side of said relief valve to retain the same open while the throttle valve of the engine is closed.

2. A drift valve mechanism for locomotive engines, comprising a casing, a relief valve mounted therein, a drift valve also operative therein, said casing being provided with a series of openings between said relief and drift valves whereby to cause a partial vacuum at one end of the latter to open the same when the former is opened, and steam inlet and outlet ports in said casing controlled by the movement of said drift valve.

3. A drift valve mechanism for locomotive engines, comprising a casing, a relief valve mounted therein, a drift valve also operative therein, said casing being provided with a series of openings between said relief and drift valves whereby to cause a partial vacuum at one end of the latter to open the same when the former is opened, and steam inlet and outlet ports in said casing controlled by the movement of said drift valve, said casing being also provided with by-passes communicating with said ports when the drift valve is opened whereby a supply of steam is admitted to one side of said relief valve to retain the same open while the throttle valve of the locomotive is closed.

4. A drift valve mechanism for locomotive engines comprising a casing, a relief valve mounted therein, a drift valve also operative therein, a rod upon which said drift valve slides, and manually operated means carried by the casing for adjusting said rod to open said relief valve.

5. A drift valve mechanism for locomotive engines comprising a casing having a restricted end, a relief valve mounted in said casing, a drift valve also mounted in said casing and having a portion operating in the restricted end thereof, and steam inlet and outlet by-passes leading into the restricted end of the casing and arranged in adjusted position and controlled by the movements of said drift valve, said casing being provided with a plurality of openings between said relief and drift valves whereby to create a partial vacuum at one end of the latter when the former is opened.

JOHN FRANCIS MILLER.

Witnesses:
JAS. N. HUNSAKER,
GEORGE W. CASS.

Copies of this patent may be obtained for five cents each, by addressing the "Commissioner of Patents, Washington, D. C."